June 12, 1962 C. VAN DER LELY ETAL 3,038,291
IMPLEMENTS FOR LATERALLY DISPLACING CROP LYING ON THE GROUND
Filed June 17, 1959 5 Sheets-Sheet 1

INVENTORS
CORNELIS & ARY VAN DER LELY
BY

Attys

United States Patent Office 3,038,291
Patented June 12, 1962

3,038,291
IMPLEMENTS FOR LATERALLY DISPLACING CROP LYING ON THE GROUND
Cornelis van der Lely and Ary van der Lely, Maasland, Netherlands, assignors to C. van der Lely N.V., Maasland, Netherlands, a Dutch limited liability company
Filed June 17, 1959, Ser. No. 820,945
Claims priority, application Netherlands July 9, 1958
18 Claims. (Cl. 56—366)

This invention relates to implements for laterally displacing crop lying on the ground, and is concerned with implements having a frame carrying rake wheels, the arrangement being such that the implement can be employed in more than one working position, the function of the implement being different in each working position so that the crop is differently worked. It is an object of the invention to provide an implement which can easily be modified from one working position to another.

According to the invention there is provided an implement for laterally displacing crop lying on the ground, wherein the implement frame includes a first frame part pivotally connected with a second frame part so that said parts are relatively movable about a non vertical axis (hereinafter identified as "said first axis"), and wherein rake wheels are carried upon said second frame part so as to be adjustable in their setting with respect thereto, the arrangement being such that the implement can occupy a first working position from which it can be brought to a second working position with the aid of mechanism which ensures that when the frame parts are relatively moved about said first axis, the rake wheels are adjusted to take up settings in relation to said second frame part appropriate to said second working position.

For a better understanding of the invention and to show how the same may be carried into effect, reference will now be made by way of example to the accompanying drawings in which.

Referring first to FIGURES 1 to 4, the implement there shown has a frame 1 carrying four rake wheels 2, 3, 4 and 5. The rake wheels are attached to a frame beam 10 and also to a control bar or rod acting as a pivot part for positioning the rake wheels consisting of a parallel frame beam 11 with the aid of cranked supporting arms 6, 7, 8 and 9. Each of the supporting arms is connected with the frame beams through the intermediary of vertical pivots 12 and 13.

Figures 1, 2:
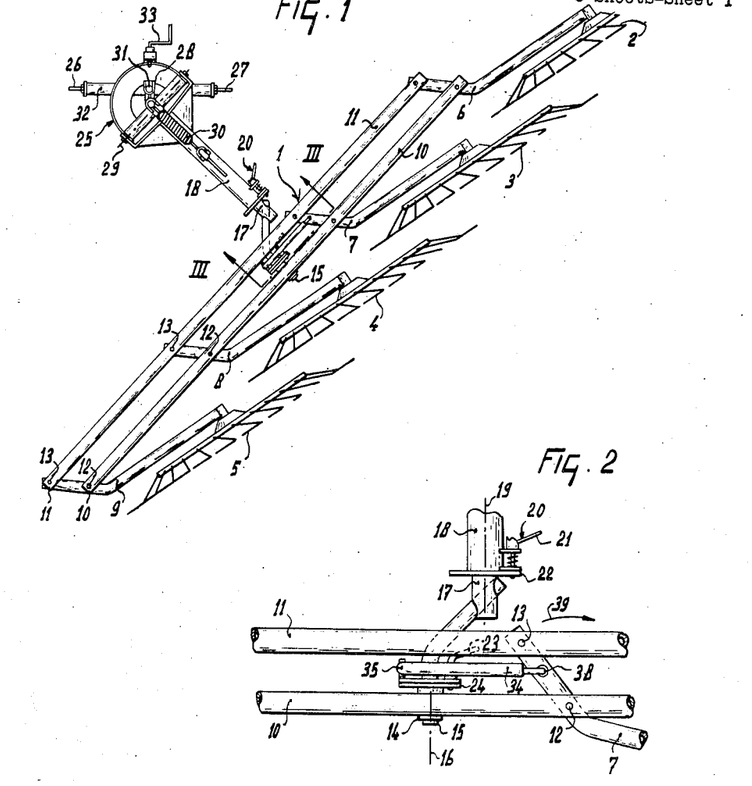
FIGURE 1 is a plan view of a first embodiment of an implement according to the invention, the implement being shown in a working position where it acts as a side-delivery rake.
FIGURE 2 is a plan view to an enlarged scale of a part of the implement shown in FIGURE 1.
Figure 3:
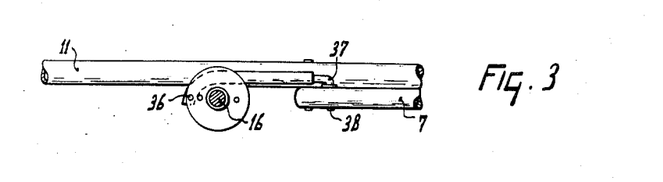
FIGURE 3 is an enlarged sectional elevation taken along the line III—III of FIGURE 1.

The settings of the rake wheels 2 to 5 can be adjusted relatively to the frame by turning their supporting arms about the pivots 12 and 13. The beam 10 has a centrally located bearing 14 in which a shaft 15 is journalled. The shaft 15 has a centre line indicated at 16 which constitutes an axis about which the rake wheels together with the frame beams 10 and 11 may be turned in order to bring the implement to another working position. The shaft 15 is fixed to a further shaft 17 which is entered in a tube 18, the latter constituting a part of the frame of the implement.

The tube 18, which is horizontal during working of the implement, has a centre line indicated at 19 which constitutes a second axis about which the rake wheels together with the frame beams 10 and 11 can be turned. The tube 18 may be conveniently regarded as a first frame part whilst the frame beams 10 and 11 constitute a second frame part. The second frame part can be locked against turning about the axis 19 of the first frame part with the aid of a locking device 20. This locking device comprises an axially movable pin 21 arranged upon the tube 18 and a flange 22 carried by the shaft 17. The second frame part can be locked against angular movement with reference to the first frame part about the axis 16, with the aid of a locking device which comprises a pin 23 carried by the shaft 15 and a flange 24 carried by the bearing 14, such flange having holes for reception of the pin 23.

The implement does not possess supporting ground wheels, and is intended to be connected to the lifting device of a tractor or the like. For this purpose the first frame part has coupling means 25 suitable for connection with a three-point lifting device of a tractor. The coupling means 25 includes two aligned pins 26 and 27 for pivotal engagement with the ends of the two lower lift links of the lifting device, and a coupler 28 for connection with the end of the upper link of the lifting device. Both parts of the frame together with the rake wheels 2 to 5 can be moved relatively to the coupling means 25 about a horizontal axis 29 which lies substantially parallel to the line joining the centres of the rake wheels 2 to 5. Angular movement of the tube 18 about the axis 29 is limited by a spring 30 which is arranged so as to tend to lift the tube 18. Hence the spring 30 serves to reduce the pressure of the rake wheels upon the ground. Such pressure can be reduced to a variable extent by anchoring one end of the spring 30 at different locations along the tube 18.

The pins 26 and 27 are located at each end of a frame beam 32, and the tube 18 can be moved relative to the frame beam 32 about a vertical axis 31. The tube 18 can be locked against movement about the axis 31 with the aid of a locking device 33.

Figure 4:
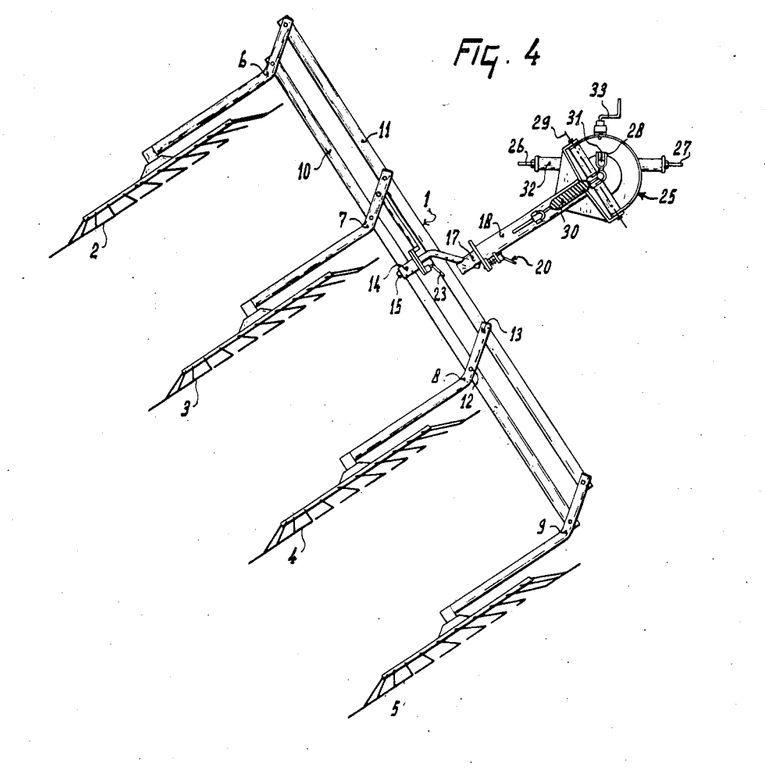
FIGURE 4 is a view similar to FIGURE 1 but showing the implement in a second working position in which it operates as a tedder.

With the implement in the position shown in FIGURE 1, the coupling means 25 can be connected to a tractor so that the axis of the aligned pins 26 and 27 lies substantially perpendicular to the longitudinal axis of the tractor. When the tractor is driven forwardly, the rake wheels 2 to 5 encounter ground and/or the crop lying thereon whereby the rake wheels are set in rotation. Each preceding rake wheel delivers the crop to a succeeding rake wheel so that in the illustrated position the implement acts as a side-delivery rake. The implement can be brought to a second working position in which each rake wheel will independently work a strip of land so that the implement then acts a tedder. This working position is shown in FIGURE 4. To attain the working position shown in FIGURE 4 commencing with the working position shown in FIGURE 1, the second frame part of the implement is first turned through 180° about the axis 16. This turning movement can be conveniently effected by raising the implement with the lifting device of the tractor or the like to an extent such that the turning motion can be achieved without fouling the ground. It will be appreciated that the locking pin 23 is withdrawn to permit the turning motion and is replaced after the frame has been turned through 180°. The turning about the axis 16 automatically causes the settings of the rake wheels to be adjusted with reference to the frame. This automatic adjustment is achieved with the aid of a rod 34 one end 35 of which is pivotally connected to the flange on the shaft 15 which carries the locking pin 23. The pivot associated with the end 35 of the rod is seen at 36 in FIGURE 3.

The end 37 of the rod 34 has a cranked extremity 38 which is entered in a bearing in the supporting arm 7.

When the frame beams 10 and 11 are turned about the axis 16 of the shaft 15, the pin 36, being fixed in relation to the shaft 15, will cause the cranked end 38 to move outwardly from the axis 16. After 180° of movement about the axis 16 has been completed from the position shown in FIGURE 2. The cranked end 38 will be more distant from the axis 16 by an amount equal to twice the distance between such axis and the axis of the pivot 36. As a result, the supporting arm 7 will be constrained by the rod 34 to move about its pivot 12, in the direction indicated by the arrow 39 in FIGURE 2. Hence the associated rake wheel 3 will be brought to the setting illustrated in FIGURE 4. The supporting arm 7 is, however, also pivotally connected to the frame beam 11 at 13, and hence the frame beam 11 will also be moved.

The movement of the frame beam 11 will be communicated to the ends of the other supporting arms pivotally attached thereto and hence the other supporting arms 6, 8 and 9 will be adjusted so as to have the same setting as the arm 7.

Hence the mechanism which essentially includes the rod 34 allows the setting of the rake wheels to be rapidly and automatically altered so that such setting is appropriate to another working position of the implement. The frame beam 11 acts a coupling link in relation to the supporting arms of the rake wheels, such frame beam being of the same length as the frame beam 10 and being parallel thereto. The two frame beams and the supporting arms for the rake wheels constitute a parallelogram link structure.

The rake wheels 2 to 5 may be of any known construction and may be of the type in which one particular side of the rake wheel has to be turned to face and engage the crop. Assuming this to be the case, then to bring the implement to the tedding position it will also be necessary to swing the frame beams 10 and 11 together with the rake wheels about the vertical axis 31 so that they occupy the position shown in FIGURE 4. This adjustment is effected by releasing the locking device 33 and making the locking device once more effective after the adjustment has been completed. It will be appreciated that in the working position shown in FIGURE 4 with the implement connected to the tractor, the axis of the aligned pins 26 and 27 will be substantially perpendicular to the longitudinal axis of the tractor.

Hence the movement of adjustment about the vertical axis 31 effectively swings the rake wheels transversely across the line of travel. If, on the other hand, rake wheels are employed which can equally well engage the crop on either side, then the adjustment about the axis 31 is not necessary in proceeding from the side delivery raking position to the tedding position. Nevertheless, the adjustment about the axis 31 is useful in order to be able to set the inclination of the row of rake wheels relatively to the line of travel according to the nature of the crop to be worked.

It will be recalled that in addition to the axis of adjustment 16, there is a further axis of adjustment 19. When the implement is being employed for side delivery raking, it will be advantageous to enter the locking pin 21 in an elongated hole in the flange 22 so that the rake wheels and the parallelogram link structure which supports them can move to a limited extent about the axis 19. This permits the rake wheels to move up and down and thus accommodate unevenesses in the ground. When the implement is employed for tedding, it may be advantageous to dispense with this limited freedom for movement about the axis 19. The possibility of adjustment about the axis 19 is also useful for bringing the implement to a transport position. To attain the transport position the implement may be lifted with the aid of the lifting device of the tractor and thereafter the rake wheels, together with their supporting structure, can be swung about the axis 19 until the effective width of the implement has been sufficiently reduced, whereupon the pin 21 may be employed to lock the implement in the transport position.

Figures 5, 6:
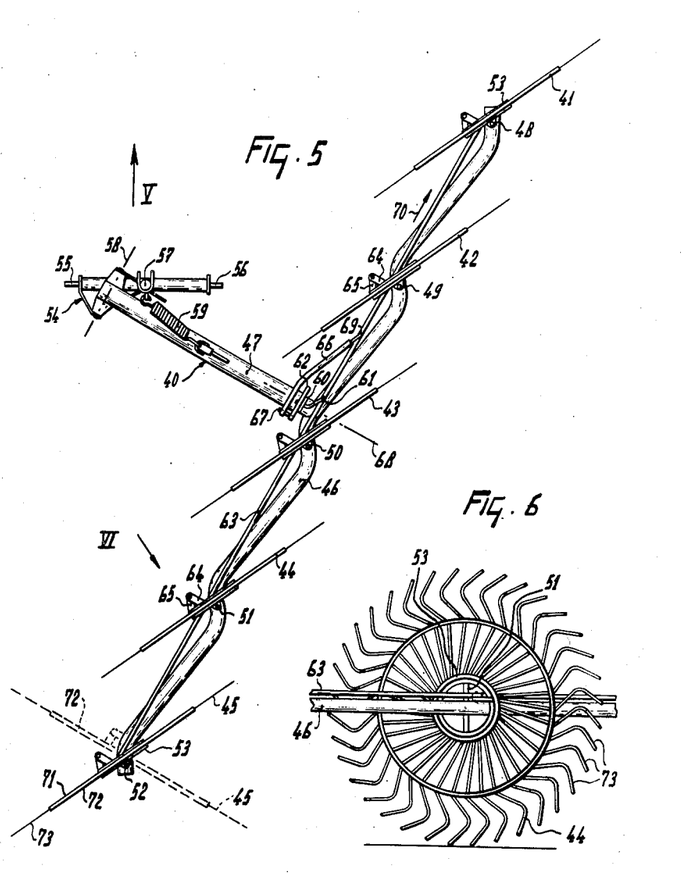
FIGURE 5 is a view similar to FIGURE 1 but showing a second embodiment of the implement.
FIGURE 6 is a side elevation of part of the implement shown in FIGURE 5 as seen looking in the direction of the arrow VI shown in FIGURE 5.

Referring now to FIGURES 5 and 6, there is shown a second embodiment comprising a frame 40 carrying five rake wheels 41, 42, 43, 44 and 45. The frame 40 principally comprises a frame beam 46 which constitutes the second frame part, and a frame beam 47 disposed substantially at right angles thereto and which constitutes the first frame part. The rake wheels 41 to 45 are connected with the frame beam 46 through the intermediary of vertical pivots 48, 49, 50, 51 and 52, the rake wheels having large hubs 53 through which the frame beam 46 passes.

The implement does not possess ground wheels and is intended to be connected with the lifting device of a tractor or the like, the frame beam 47 having coupling means 54 designed for co-operation with a three-point lifting device. The coupling means 54 includes two aligned pins 55 and 56 and a coupler 57, all as described previously in connection with the construction shown in FIGURES 1 to 4. The frame beam 47 can turn relative to the coupling means 54 about a horizontal axis 58, whereby the rake wheels can correspondingly move up and down to accommodate unevenesses in the ground. A spring 59 is arranged so as to be effective between the beam 47 and the coupling means 54, such spring tending to lift the beam 47 thereby ensuring that the rake wheels 41 to 45 will not bear on the ground under the action of their own full weight and that of the frame which carries them.

The frame beam 46 is connected with the frame beam 47 with the aid of a shaft 60 one end of which is fixed to the beam 46 whilst the other end is entered in the hollow tubular beam 47. The shaft 60 can be turned in the tubular beam 47, and a locking pin 61 is provided for holding the shaft and beam in desired positions. The pin 61 is effectively carried by the shaft 60 and can co-operate with holes formed in a flange 62 secured upon the beam 47.

When the implement shown in FIGURE 5 is connected to a tractor, the implement may be moved in the direction indicated by the arrow V. The rake wheels 41 to 45 will be rotated by virtue of their contact with the ground and/or the crop lying thereon, the crop being delivered from the leading rake wheel to a next following rake wheel so that the implement acts as a side delivery rake. From this working position illustrated in FIGURE 5, the implement may be brought to a second working position where it will operate as a tedder. To attain this second working position, the rake wheels 41 to 45 are turned about their vertical pivots 48 to 52 until each of the rake wheels reaches the setting illustrated in broken lines in FIGURE 5 for the rake wheel 45. The turning of the rake wheels to the new setting is achieved by turning the shaft 60 through 180° in the tubular frame beam 47 with the aid of mechanism acting as a pivot control bar or rod part for positioning the rake wheels consisting of a connecting rod 63 which extends along the frame beam 46 and passes through the hubs 53 of the rake wheels. The connecting rod 63 has fixed arms 64 extending therefrom which are pivotally connected with fingers 65 attached to the hubs 53 of the rake wheels. The connecting rod 63 is connected as at 69 with one end of an actuating rod 66 the other end of which is pivotally connected at 67 to the flange 62.

It will be understood that on releasing the locking pin 61, the beam 46 may be swung around the axis 68 of the tubular frame member 47 through an angle of 180° in one direction. As the result of this movement, the end 69 will move outwardly from the axis 68 so that the connecting rod 63 will move in the direction indicated by the arrow 70. The movement of the connecting rod 63 will cause the rake wheels to be turned about their vertical pivots. At the end of 180° movement about the axis 68, the connecting rod 70 will have been displaced a distance equal to twice the distance between the axis 68 and the axis of the pin 67.

When the implement is in the working position shown in FIGURE 5 where it acts as a side delivery rake, the rake wheels will turn in a direction such that as seen in FIGURE 6 they move anti-clockwise. The rake wheels possess tines 73 which are backwardly directed in relation to the rotation of the rake wheel, whereby the tips of the tines are in a position as these tips move upwardly on the right side of the wheel when the wheel is turning counterclockwise and moving the crop, and as viewed at the angle shown in FIGURE 6. This ensures that the crop is correctly shed from the tines. The rake wheels are substantially planar, and it is immaterial whether the side indicated at 71 or the side indicated at 72 in FIGURE 5, engages the crop. In fact it is the side 71 which engages the crop when the implement is acting as a side delivery rake. When the implement is brought to the second working position by rotating the frame beam 46 180° about the axis 68, the rake wheels are turned about their pivotal mountings so that for example the rake wheel 45 occupies the broken line position and also the rake wheel 45 will be swung about the axis 68 so that it will occupy approximately the location shown for the rake wheel 41. Hence the side 72 will now be that which faces and engages the crop. The direction of rotation of the rake wheels when the implement is in the second working position and is travelling in the direction indicated by the arrow V, will however, be such that the tips of the tines will still lag the roots thereof on the rising side of the rake wheels. Hence satisfactory shedding will also be obtained in the second working position.

Figures 7, 8, 9:
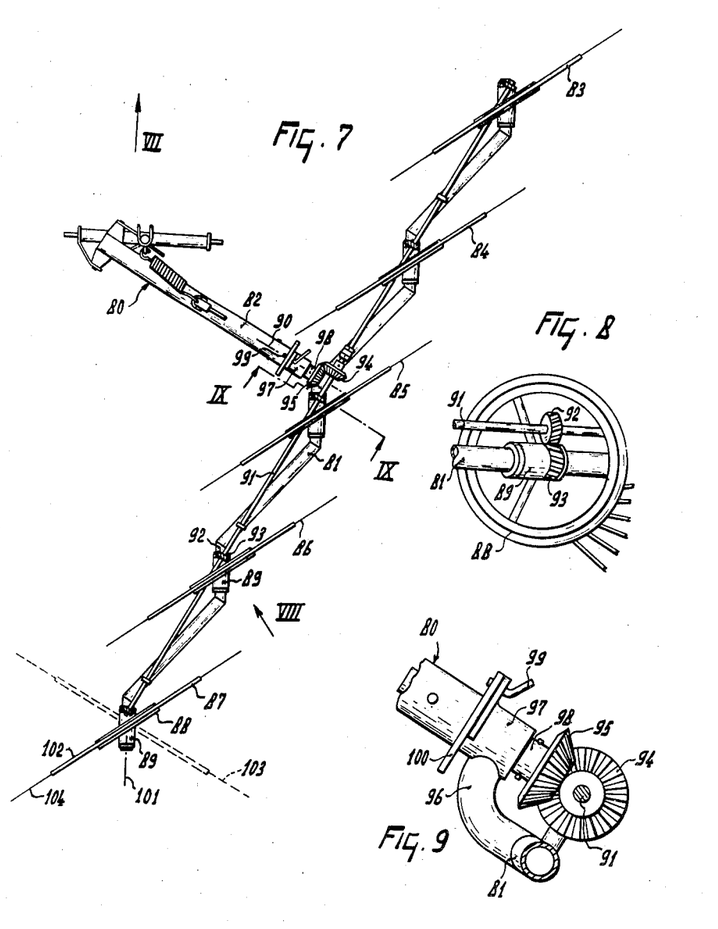
FIGURE 7 is a view similar to FIGURE 1 but showing a third embodiment of the implement.
FIGURE 8 shows to an enlarged scale a detail of the implement shown in FIGURE 7 as viewed in the direction of the arrow VIII in FIGURE 7.
FIGURE 9 is an enlarged sectional detail of the implement shown in FIGURE 7 as taken along the line IX—IX in FIGURE 7.

Referring now to FIGURES 7, 8 and 9 there is shown a third embodiment which closely resembles the implement shown in FIGURES 5 and 6. The implement has a frame 80 consisting principally of a frame beam 81 and a frame beam 82. The frame beam 82 constitutes the first part of the frame and the frame beam 81 the second part thereof. The frame beam 81 carries five rake wheels 83, 84, 85, 86 and 87, the hubs 88 of which are so formed that the frame beam can pass through them. Each of the hubs 88 is supported on a horizontal bearing sleeve carried on the frame beam 81.

The implement has no ground wheels and can be connected to the lifting device of a tractor or the like in the same manner as the implement shown in FIGURE 5, the frame beam 82 thus having coupling means as illustrated in FIGURE 5, which means need no further description.

The implement shown in FIGURE 7 in the working position there illustrated, when towed in the direction indicated by the arrow VII operates as a side-delivery rake in the same way as described in connection with the implement shown in FIGURE 5. The implement of FIGURE 7 can be brought to a second working position in which the rake wheels individually work a strip of ground so that the implement then acts as a tedder.

The implement can be brought from its working position as a side-delivery rake into that as a tedder by turning each of the bearing sleeves 89 through 180° with reference to the frame beam 81 which supports them. This movement of each bearing sleeve 89 causes the hub 88 attached thereto to be brought to a new setting indicated in broken lines for the rake wheel 87. This new setting for each of the rake wheels can be achieved by turning the whole row of rake wheels together with the frame beam 81 through an angle of 180° about an axis which is horizontal or substantially horizontal during working of the device indicated at 90 with the aid of mechanism that will now be described. Such mechanism comprises a control rod acting as a rake wheel pivot part for the purpose of positioning the rake wheels consisting of a shaft 91 which is passed through the hubs 88 of the rake wheels and which is supported for rotation at various places along the beam 81. The shaft 91 has fixed upon it five skew gears 92 which mesh with corresponding skew gears 93 fast with the bearing sleeves 89. The shaft 91 has also fixed thereon a bevel gear 94 which meshes with a bevel gear 95.

The latter is fast upon a shaft 98 which is entered in the frame beam 82 and which is rigidly fixed therein. A bearing sleeve 97 is mounted upon the shaft 98 and is rigidly fixed at one end of a massive bracket 96 the other end of which is rigid with the beam 81.

The axis 90 previously identified, is, of course, the centre line of the shaft 98 and passes through the centre line of the shaft 91. The frame beam 98 can be turned about the axis 90 by angularly moving the bearing sleeve 97 upon the shaft 98. The beam 81 may be locked against such angular movement with the aid of a locking pin 99 carried by the bearing 97 and entered into an appropriate hole in a flange 100 formed upon the exterior of the beam 82.

It will now be understood that when the beam 81 is turned 180° about the axis 90 after the locking pin 99 has been removed, the bevel gear 94 will roll upon the bevel gear 95, the latter being held in fixed position relative thereto. Hence the shaft 91 will be turned through 180° and the skew gears 92 will be correspondingly turned through a similar angle whereby the bearing sleeves 89 will likewise be turned through 180° about centre lines 101.

In the first working position of the implement where it acts as a side-delivery rake, the rake wheels have their sides 102 facing and engaging the crop. In the second working position where the implement acts as a tedder, the sides 103 of the rake wheels are presented to the crop. The rake wheels have tines 104 which are orientated backwardly with reference to the direction of rotation of the rake wheels as was described in connection with FIGURE 6. The conversion of the implement shown in FIGURE 7 from a side-delivery rake to a tedder will automatically bring the rake wheels into correct relation as regards their tines, in just the same manner as was described in connection with the implement shown in FIGURE 5.

It will be appreciated that in the embodiments illustrated in FIGURES 5 and 7 the connecting rod 63 and the shaft 91 act as coupling elements as between the rake wheels whereby the settings of the rake wheels can be simultaneously altered. In both the described embodiments, the alteration of the settings of the rake wheels is effected by turning the rake wheels and the frame member which carries them about a horizontal axis. If so desired, modifications may be made whereby the coupling elements are actuated otherwise than by turning the rake wheels about such horizontal axis.

Figure 10:
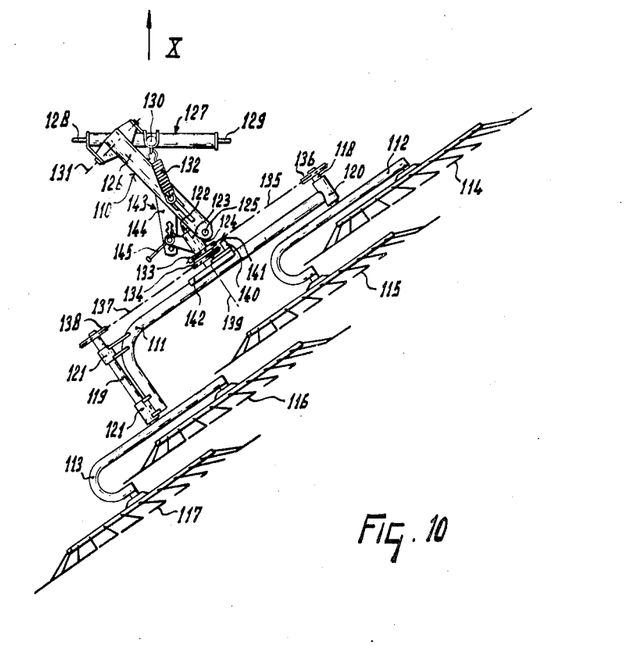
FIGURE 10 is a view similar to FIGURE 1 but showing a fourth embodiment of the implement.

Referring now to FIGURE 10, there is shown a third embodiment which comprises a frame 110. The latter includes a frame beam 111 which supports at its ends two smaller frame beams 112 and 113, carrying rake wheels 114, 115 and 116, 117. The frame beams 112 and 113 are pivotally connected to the beam 111 by horizontal shafts 118 and 119 mounted in bearings 120 and 121. Hence the beams 112 and 113 together with their rake wheels can turn relatively to the frame beam 111. A shaft 122 is fixed at one end to the frame beam 111, such shaft lying centrally between, and parallel to, the shafts 118 and 119. The shaft 122 is entered in a bearing sleeve 123, the latter having an integral lateral extension 124 formed with a vertical bore for the reception of a pivot 125. The latter is connected with a tubular frame beam 126 which may be regarded as constituting the first frame part, the second frame part being constituted by the frame beam 111. The second frame part is turnable with reference to the first about the horizontal axis 139 which is the centre line of the shaft 122, and about a vertical axis, i.e. the centre line of the pivot 125.

The first part of the frame consisting of the tubular frame beam 126 is provided with coupling means 127 to permit the implement to be connected with the lifting device of a tractor or the like. The coupling means comprises two aligned pins 128 and 129 and a coupler 130 located above the aligned pins. Such coupling means are intended to co-operate with the ends of the links of a three-point lifting device. The tubular frame beam 126 is mounted for angular movement about a horizontal axis 131, there being a spring 132 which is connected at one end to the beam 126 and at the other end to the coupling means. It will be appreciated that both parts of the implement frame together with the rake wheels can move about the axis 131. The spring 132 reduces the pressure of the rake wheels on the ground by resisting the downward movement of the frame about the axis 131.

When the implement shown in FIGURE 10 is connected to a tractor or the like and travels in the direction indicated by the arrow X, the rake wheels will be rotated by virtue of their contact with the ground and/or the crop lying thereon, and they will co-operate to deliver the crop laterally, the implement then acting as a side-delivery rake. The rake wheels are all in one row and are substantially evenly spaced although they are in fact divided into two groups 114, 115 and 116, 117. From the illustrated working position, the implement may be brought to a second working position in which each group of rake wheels will independently work a strip of ground so that only the rake wheels of each group co-operate with one another. This corresponds to a swath turning position for the implement. The conversion to a swath turner is achieved with the aid of mechanism comprising a pair of sprocket wheels 133 and 134 fixedly carried on the bearing sleeve 123, the sprocket wheel 133 being in driving connection with a sprocket wheel 136 fast on the shaft 118 through a chain 135. The sprocket wheel 134 is in driving connection with a sprocket wheel 138 fast upon the shaft 119, through the intermediary of a chain 137.

The second working position of the implement is attained by turning the frame beam 111 about the axis 139, which lies horizontal during the working of the implement. This causes the shaft 122 to turn in the bearing sleeve 123. The sprocket wheels 133 and 134 remain relatively stationary and hence the chains 135 and 137 cause the sprockets 136 and 138 to be turned. Upon completing 180° of movement of the beam 111, the beams 112 and 113 will also have been turned 180° in their bearings 120 and 121. Hence the rake wheel group 116, 117 will be transferred to the other side of the axis 139, and similarly the group 114 and 115 will likewise be transferred to the other side of the axis 139. A locking device 140 is provided for locking the beam 111 against movement about the axis 139. Such locking device essentially comprises a locking pin 141 carried upon the bearing sleeve 123 and a strip 142 fixed upon the beam 111, the strip having holes for appropriately receiving the locking pin.

The settings of the rake wheels in regard to their obliquity with reference to the line of travel can be adjusted in accordance with the conditions of working and the nature of the crop to be worked. This adjustment is effected by turning the second frame part relative to the first about the vertical axis constituted by the pivot 125. Locking in the desired position of adjustment about such pivot, is effected with the aid of a locking device 143. The latter comprises a finger extending from the beam 126 and a clamp 145 attached to the bearing sleeve 123, the clamp being releasable and movable in an appropriately fashioned slot in the finger.

In all the previously described constructions, the turning of the second frame part with reference to the first frame part will require exertion of but a small effort if the centre of gravity of the second frame part is located on, or near to, the axis about which said second frame part is moved.

What we claim is:

1. A side delivery rake for laterally displacing hay or other material lying on the ground comprising a coupling means for connection to a tractor, a first frame part extending rearwardly from said coupling means, a second frame formed by a beam, a plurality of rake wheels carried on said second frame part, each of said rake wheels being turnable about a vertical pivot axis relative to said second frame part, hubs included on each of said rake wheels, said second frame part being passed through the hubs of said rake wheels, and a coupling member interconnecting said rake wheels, said coupling member also passing through the hubs of said rake wheels and serving to adjust the settings of said rake wheels simultaneously about their vertical pivot axes to be placed in position for tedding.

2. A side delivery rake for laterally displacing hay or other material lying on the ground comprising a draught means with a frame part connected thereto, a plurality of vertical pivots spaced on said frame part, a control rod disposed parallel to said frame part, a plurality of further vertical pivots spaced on said control rod, the spacing of the first-mentioned pivots corresponding to the spacing of the further pivots, a plurality of overlapping rake wheels spaced in echelon along said frame part, a supporting arm mounting each of said rake wheels, each supporting arm being connected to said frame part by one of said first-mentioned pivots and to said control rod at the corresponding said further pivot, whereby when said control rod is moved in relation to said frame part said arms place said rake wheels in a tedding position, and a locking device for locking said frame part in selective relation to said control rod.

3. A side delivery rake for laterally displacing hay or other material lying on the ground comprising a coupling means for connection with a three-point lifting device of the tractor, a first frame part connected to said coupling means and extending rearwardly therefrom, a second frame part connected intermediate its ends at right angles to the further end of said first frame part, a plurality of vertically pivoted members spaced equidistantly on said second frame part, a parallel frame beam disposed parallel to said second frame part, a plurality of further vertical pivot members spaced equidistantly on said frame beam and corresponding to said first-mentioned pivot members, a plurality of overlapping rotatable rake wheels spaced in echelon along said second frame part, a supporting arm mounting each of said rake wheels, each supporting arm being connected to said second frame part by one of said first-mentioned pivot members and to said frame beam at the corresponding said further pivot member, whereby when said frame beam is moved relative to said second frame part said arms pivot to place said rake wheels in a tedding position, and a locking device for securing said second frame part in selective relation to said frame beam.

4. A side delivery rake for laterally displacing hay or other material lying on the ground comprising a draught means with a frame part connected thereto, a plurality of rake wheels disposed along said frame part in overlapping echelon, hubs included in each of said rake wheels, vertical pivots connecting said frame part to each of said rake wheels, said frame part passing through said hubs, a connecting rod disposed parallel to said frame part, said connecting rod passing through said hubs, a plurality of arms operatively associated with said connecting rod and said pivots whereby when said connecting rod is moved in relation to said frame part said rake wheels are pivoted into a tedding position, and a locking device for securing said frame part in selective relation to said connecting rod.

5. A side delivery rake for laterally displacing hay or other material lying on the ground comprising a coupling means for connection to a three-point lifting device on a tractor, a first frame part connected on one end to said coupling means and extending rearwardly therefrom, a second frame part connected intermediate its ends to the further end of said first frame part and substantially at right angles thereto, a plurality of rotatable rake wheels disposed in echelon along said second frame part, hollow hubs included in each of said rake wheels, vertical pivot members interconnecting said second frame part and each of said rake wheels, said second frame part passing through said hollow hubs, a connecting rod disposed substantially parallel to said second frame part, said connecting rod passing through said hollow hubs, a plurality of arm members interconnecting said connecting rod and said pivot members whereby when said connecting rod is moved in relation to said second frame part said rake wheels are pivoted to a tedding position, and a locking device for securing said frame part in selective relation to said connecting rod.

6. A side delivery rake for laterally displacing hay or other material lying on the ground comprising a draft means with a frame part connected thereto, a plurality of rake wheels disposed along said frame part in overlapping echelon, hubs included in each of said rake wheels, said frame part passing through said hubs, bearing sleeves spaced on said frame part where said frame part passes through said hubs, connecting means connecting each of said rake wheels to the corresponding sleeves on a bias, rotating means for rotating said sleeves in unison to place said rake wheels in tedding position, and a locking device for selective securing of said rotating means and locking said rake wheels in position for tedding or side delivery.

7. A side delivery rake for laterally displacing hay or other material lying on the ground comprising a coupling means for connection with a three-point lifting device of a tractor, a first frame part connected to said coupling means and extending rearwardly therefrom, a second frame part connected intermediate its ends to the other end of said first frame part and substantially at right angles thereto, a plurality of rotatable rake wheels disposed along said second frame part in overlapping echelon, hollow hubs included in each of said rake wheels, said second frame part passing through said hollow hubs, bearing sleeves spaced on said second frame part where said second frame part passes through said hubs, connecting means interconnecting each of said rake wheels to the corresponding sleeve, said connection between each of said sleeves and rake wheels being such that the longitudinal axis of said sleeves is in an angular relation to the axis of rotation of said rake wheels, a shaft disposed parallel to said second frame part and extending through said hollow hubs, first skew gears on each of said sleeves, second skew gears spaced on said shaft to engage said first skew gears whereby when said shaft is rotated said sleeves are rotated by said skew gears in unison to place said rake wheels in a tedding position, and a locking device for selective locking of said shaft.

8. A side delivery rake for laterally displacing hay or other material lying on the ground comprising a coupling means for connection to a tractor, a first frame part extending rearwardly from said coupling means, a second frame part connected to said first frame part in angular relation thereto, at least two parallel shafts extending rearwardly from said second frame part, further frame parts connected to said shafts, a plurality of parallel overlapping rotatable rake wheels spaced in echelon along said further frame parts and being mounted thereon, control means associated with each of said shafts whereby when said control means is actuated said shafts with said rake wheels mounted thereon are rotated in unison to place said rake wheels in a swath turning position.

9. A side delivery rake for laterally displacing hay or other material lying on the ground comprising a coupling means for connection to the lifting device of a tractor, a first frame part extending rearwardly from said coupling means, a second frame part intermediate its ends connected to said first frame part in angular relation thereto, a plurality of parallel overlapping rotatable rake wheels spaced in echelon along said second frame part, an arm associated with each of said rake wheels, each of said arms being pivotally connected to said second frame part, a control bar disposed substantially parallel to said second frame part, said control bar being pivotally connected to each of said arms, said bar being adapted to move each of said arms so as to place said rake wheels in a tedding position, and securing means for selective securing the relative positions of said control bar and said second frame part.

10. A side delivery rake for laterally displacing hay or other material lying on the ground comprising a coupling means for connection to a tractor, a first frame part extending rearwardly from said coupling means, a second frame part pivotally connected about a non vertical axis to said first frame part in angular relation thereto, a plurality of parallel overlapping rotatable rake wheels spaced in echelon along said second frame part, a hub included in each of said rake wheels, a rake wheel pivot part associated with each of said hubs, a rake wheel control rod disposed substantially parallel to said second frame part, said rod engaging each of said rake wheel pivot parts whereby when said rod is moved if said second frame part moves relatively to said first frame part, each of said rake wheel pivot parts move causing their associated rake wheels to be pivoted in unison through an arc into a tedding position and securing means for selective securing the relative positions of said control rod and said second frame part.

11. A side delivery rake for laterally displacing hay or other material lying on the ground comprising a coupling means for connection with a three-point lifting device of a tractor, a first frame part connected to said coupling means and extending rearwardly therefrom, a second frame part connected intermediate its ends to the other end of said first frame part and in angular relation thereto, a plurality of rake wheels disposed along said second frame part in overlapping echelon, supporting members for said rake wheels, said supporting members being connected to said second frame part in such manner that they can be pivoted thereon, control means to cooperate with said supporting members whereby said supporting members may be pivoted simultaneously to place said rake wheels in different working positions, and locking means which cooperate with said control means to secure selectively the relative position of said rake wheels and said second frame part.

12. A side delivery rake for laterally displacing hay or other material lying on the ground comprising a coupling means for connection with a tractor, a first frame part connected to said coupling means and extending rearwardly therefrom, a second frame part connected intermediate its ends to the other end of said first frame part in angular relation thereto, a plurality of rake wheels disposed along said second frame part in overlapping echelon, said second frame part disposed substantially at the same height as the axis of rotation of the rake wheels, supporting members for said rake wheels, said supporting members being connected to said second frame part in such manner that they can be pivoted thereon, control means to cooperate with said supporting members whereby said supporting members may be pivoted simultaneously to place said rake wheels in different working positions, and locking means which cooperate with said control means to secure selectively the relative position of said rake wheels and said second frame part.

13. A side delivery rake for laterally displacing hay or other material lying on the ground comprising a coupling means for connection with a three-point lifting device of a tractor, a first frame part connected to said coupling means and extending rearwardly therefrom, a second frame part pivotably connected intermediate its ends to the rearward aspect of said first frame part in angular relation thereto, a plurality of rake wheels disposed along said second frame part in overlapping echelon, supporting members for said rake wheels connected to said second frame part in such a manner that they can be pivoted thereon, control means cooperating with said supporting members, whereby said supporting members are simultaneously pivoted when said second frame part moves relative to said first frame part to place said rake wheels in different working positions, and locking means cooperating with said control means to secure selectively the relative position of said rake wheels and said second frame part.

14. The structure of claim 42 wherein said rake wheels have axes of rotation lying in the same plane, said second frame part being disposed substantially in the same horizontal plane as the axes of rotation of said rake wheels.

15. The structure of claim 10 wherein said rake wheels have axes of rotation lying in the same plane, said second frame part being disposed substantially in the same horizontal plane as the axes of rotation of said rake wheels.

16. The structure of claim 11 wherein said rake wheels have axes of rotation lying in the same plane, said second frame part being disposed substantially in the same horizontal plane as the axes of rotation of said rake wheels.

17. The structure of claim 12 wherein said rake wheels have axes of rotation lying in the same plane, said second frame part being disposed substantially in the same horizontal plane as the axes of rotation of said rake wheels.

18. The structure of claim 13 wherein said rake wheels have axes of rotation lying in the same plane, said second frame part being disposed substantially in the same horizontal plane as the axes of rotation of said rake wheels.

References Cited in the file of this patent

FOREIGN PATENTS

| | | |
|---|---|---|
| 1,108,778 | France | Sept. 14, 1955 |
| 555,299 | Italy | Jan. 19, 1957 |
| 1,139,762 | France | Feb. 18, 1957 |